April 6, 1965

W. J. SCHRENK ETAL 3,176,965

COUNTER-ROTATING DISC MIXER

Filed Aug. 22, 1962

INVENTORS
WALTER J. SCHRENK,
DOUGLAS S. CHISHOLM
AND TURNER ALFREY, JR.
BY
Att'ys.

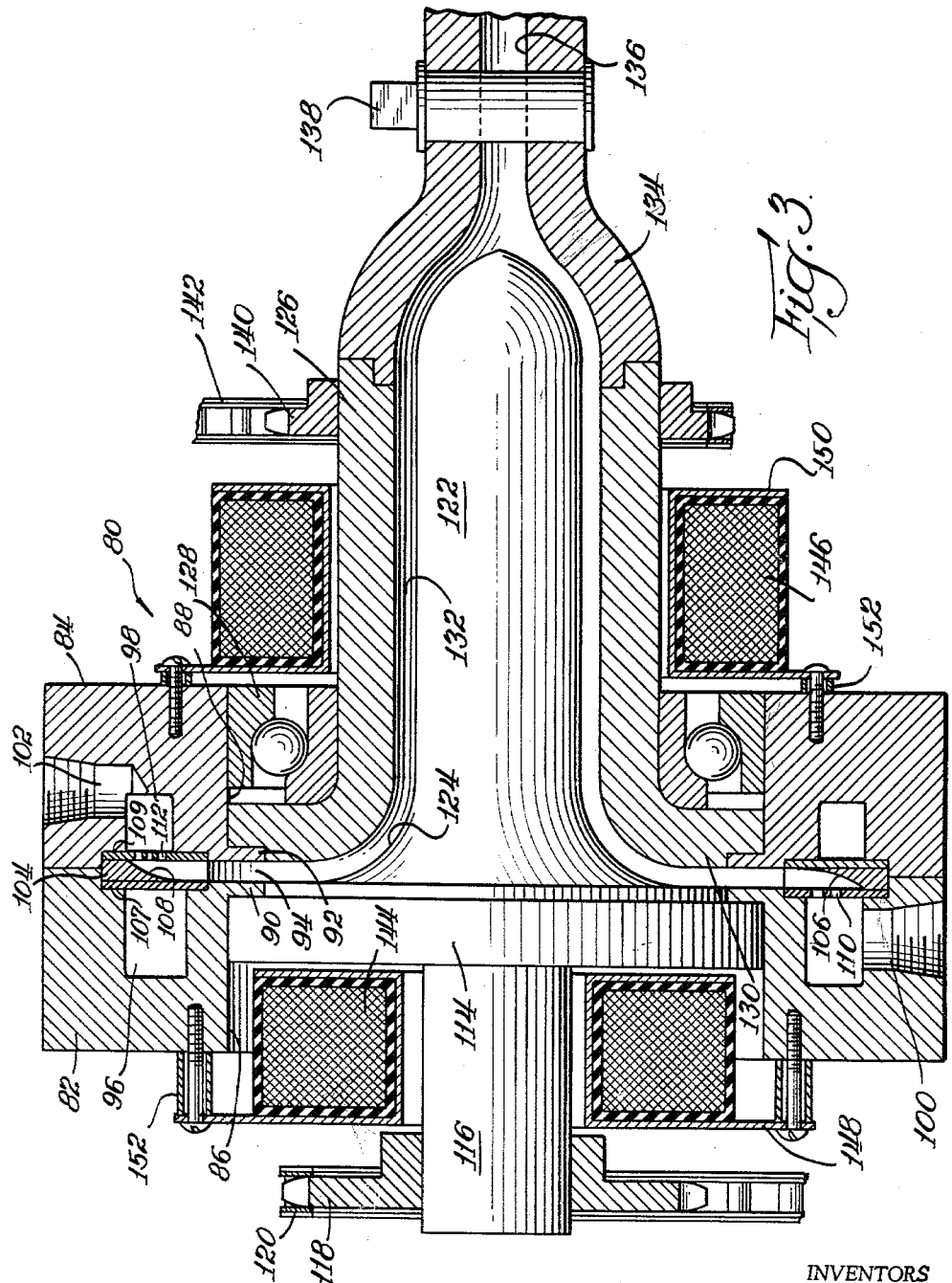

3,176,965
COUNTER-ROTATING DISC MIXER
Walter J. Schrenk, Bay City, and Douglas S. Chisholm and Turner Alfrey, Jr., Midland, Mich., assignors to The Dow Chemical Company, Midland, Mich., a corporation of Delaware
Filed Aug. 22, 1962, Ser. No. 218,782
12 Claims. (Cl. 259—6)

This invention relates to an improvement in mixers for continuously mixing, or blending, two or more viscous liquids.

Our copending application Serial No. 98,105, filed March 24, 1961, now Patent No. 3,127,152, discloses a mixer having concentrically arranged cylinders providing a cylindrical mixing chamber into which diverse viscous liquids are fed and are mixed therein, with accentuated shearing action, as the liquids are moved through the mixing chamber.

In one of the two embodiments incorporating the principles of the subject invention, the basic structure of the copending application supra, forms part of a combination which operates to provide a very efficient mixer.

An important and fundamental aspect of the inventive concept disclosed herein, relates to the use of adjacent discs, which are spaced apart to provide a mixing chamber to which liquids are fed in alternate and continuously flowing ribbons. The materials thus fed into the mixing chamber, pass through an axially arranged passageway and onward to a point of collection, or usage, as the case may be. It will also be seen that various mixing profiles may be achieved by altering the relative movement of various parts of the apparatus of the invention.

The method and apparatus disclosed herein, represents an improvement in the art of mixing diverse, viscous liquids. One important advantage afforded by the apparatus of the invention is the reduced time required for mixing. Polymers generally have good thermal insulating qualities so that heating the material by conduction while in the conventional type mixer, requires relatively long periods of time. In addition, there is always a danger of thermal degradation of the polymers, if high heat rates are used. The apparatus of the subject invention avoids such shortcomings of prior art devices, because internal friction, due to shearing action, may be relied upon to attain and/or maintain desired temperature of the polymers being mixed.

The main object of the present invention is to provide an improved method and apparatus for mixing diverse, viscous liquids.

A more specific object is to provide apparatus which is relatively simple in structure, and which requires less time for producing a thorough mixing of diverse, viscous liquids.

Still another object is to provide apparatus which avoids the danger of thermal degradation of the polymers while being mixed therein.

A further object of the invention is to provide apparatus which utilizes two distinct types of action, for mixing diverse, viscous liquids.

These and further objects and features of the invention will become more apparent from the following description and accompanying drawings wherein:

FIG. 3 is a vertical section view of a modified type of mixer embodying the principles of the invention.

Figure 1:
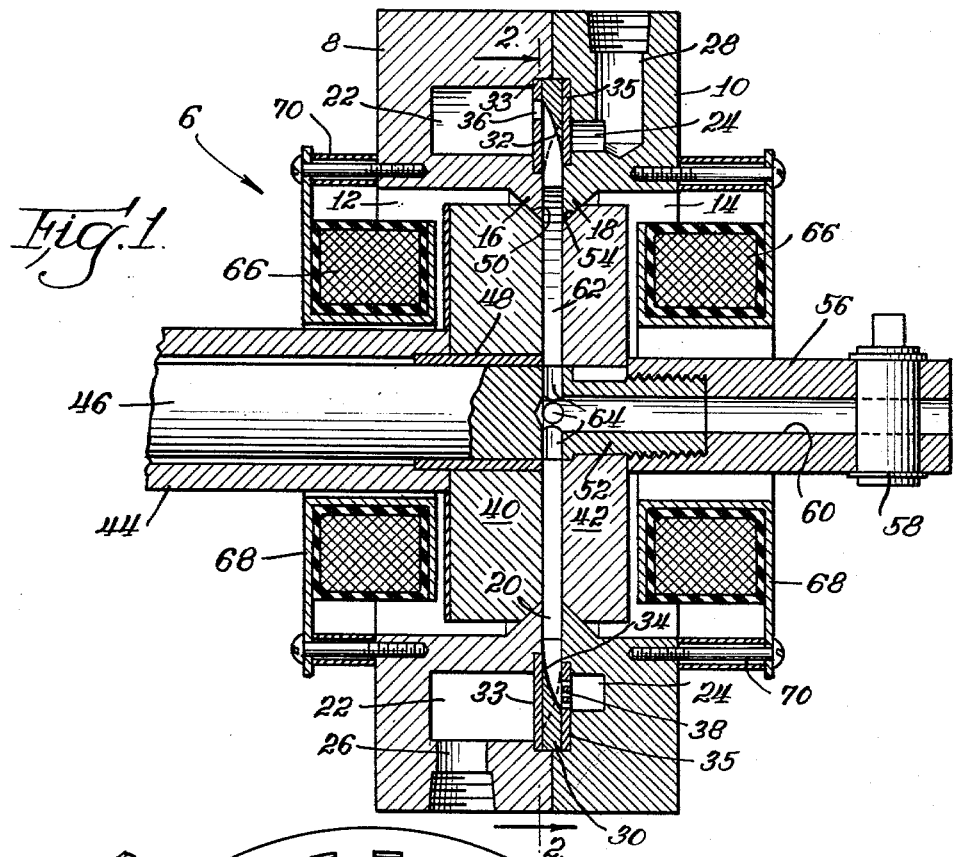
FIG. 1 is a vertical section view of a mixer embodying the principles of the invention.
Figure 2:
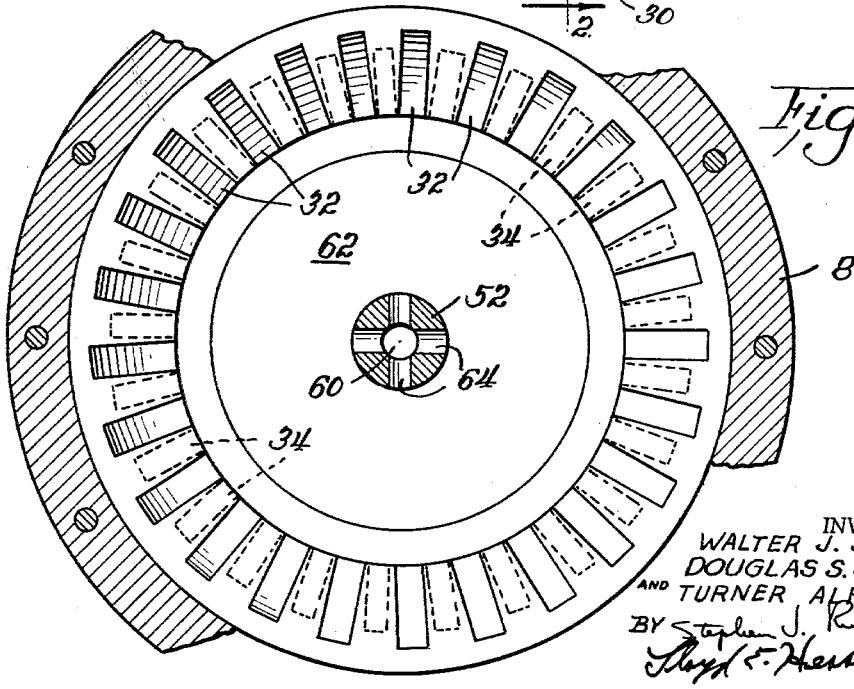
FIG. 2 is a view generally as seen from line 2—2 in FIG. 1.

Referring now to the drawings, and more particularly to FIGS. 1 and 2, numeral 6 identifies a mixer illustrative of an embodiment of the invention, which mixer includes housing sections 8 and 10 having axial, circular bores 12 and 14 respectively. Means, such as bolts (not shown) are provided for maintaining the housing sections in tight abutment. Each housing section has a tapered projection 16 and 18 extending into the respective bores 12 and 14, and are further formed to provide a circumferential recess 20 between interior adjacent regions of the housing sections, which recess opens into the bores 12 and 14. A material distributing channel 22 is formed in housing section 8, while a similar material distributing channel 24, of somewhat less dimension, is formed in the housing section 10. The channels 22 and 24 are open on their inner sides, to the recess 20. An inlet port 26 is provided for admission of material into the channel 22, while an inlet port 28 is provided for admission of material, into the channel 24. Pipe, or conduit means (not shown) are arranged to conduct liquid material to the channels 22 and 24, for mixing, or blending, in the mixer 6.

A disc-like ring 30 is positioned in the recess 20, which ring has a plurality of feed port grooves 32 and 34 arranged in alternate sequence on each side of the ring. While the number and dimensions of the feed ports may vary considerably, we have found that a feed port ring having fifty feed ports 32, each .300" wide, and fifty feed ports 34, each .030" wide, will produce satisfactory results. The feed ports are each formed with a radial groove, which extends between the sides of the ring 30, as best seen in FIG. 1, and which provide for flow of material from the channels 22 and 24 into the circumferential recess 20. To compensate for pressure drop in the channels 22 and 24, and assure uniform material flow therefrom into the recess 20, flow masks, in the form of disc means 33 and 35 having graduated diameter openings 36 and 38 respectively, are interposed between the channels 22 and 24, and the ring 30.

Positioned within the housing bores 12 and 14 are discs 40 and 42, the former being arranged for rotation by a drive shaft 44, the latter being arranged for rotation by a drive shaft 46. The disc 40 is supported upon a bushing 48, mounted upon the shaft 46 and has a tapered peripheral surface 50 which is in sliding abutment with the housing tapered projection 16. The disc 42 is secured to a forward portion 52 of the shaft 46 and has a tapered peripheral surface 54 which is in sliding abutment with the housing tapered projection 18. A shaft extension 56 is removably secured to the shaft forward portion 52, and has a valve means 58 arranged near the end thereof. An axial passageway 60 is provided in the shaft portion 52 and the shaft extension 56. The adjacent surfaces of the discs 40 and 42, are spaced apart a distance equal to the width of the circumferential recess 20, to form a disc-like recess 62. A plurality of diametrically arranged passageways 64 are formed in the shaft 46, which passageways are in alignment with the recess 20, and have a diameter substantially equivalent to the width of said recess. It will be seen that material may flow from the recess 62, through the passageways 64 and into the shaft passageway 60. The valve 58 will control flow of material out of the end of passageway 60.

Means to maintain desired temperature of the material passing through the mixer 6, is provided in the form of two induction heating coils 66, one each being arranged on each side of the discs 40 and 42. Container means 68, provided for each coil 66, are removably secured to the housings 8 and 10, by fastening means, such as sleeved bolts 70.

Operation of the mixer 6 is as follows: assume that it is desired to blend, or mix, white and black pigmented polymers, such as polystyrene, which are pumped into the inlet ports 26 and 28 respectively by extruders (not shown). The polymers pass through the feed port grooves 32 and 34 respectively of the ring 30, which arranges the white and black polymers in adjacent repetitive sectors around the periphery of the circumferential recess 62. As the polymers are forced through the recess 62, and into the passageway 60, rotary movement of the discs 40 and 42, relative to the feed port ring 30, will cause an intimate mixing of the polymers.

Four basic mixing patterns may be generated by altering the rotational velocity profile relative to the feed port ring 30. Case I is where one of the discs, say 40, is rotated at a constant angular velocity, while the other disc 42 is held stationary. Case II is merely the inverse of Case I, namely disc 40 is held stationary, while disc 42 is rotated at a constant angular velocity. In Case III, both discs are rotated in the same direction at a given angular velocity. Case IV is where both discs are rotated in opposite directions; maximum efficiency is realized as the speeds of each disc approach the same value. Generally speaking, it will be found that with Case I and II mixing patterns, excellent mixing will be achieved near the rotating disc and a small amount of mixing near the stationary disc. In Case III there will be good mixing near each of the moving discs but no mixing midway between the discs. With Case IV good mixing will be obtained throughout.

A modified embodiment incorporating the principles of a disc mixer, as in mixer 6 disclosed above, as well as those of a cylindrical mixer, as set forth in applicants' copending application supra, is illustrated in FIG. 3. The numeral 80 identifies the modified embodiment of a mixer or blender, which includes housing sections 82 and 84, having axial circular bores 86 and 88 respectively. Each housing section has a rectangular projection 90 and 92 extending into the respective bores 86 and 88, and are further formed to provide a circumferential recess 94 between interior adjacent regions of the housing sections, which recess opens into the bores 86 and 88. A material distributing channel 96 is formed in the housing section 82, while a similar material distributing channel 98, of somewhat less dimension, is formed in the housing section 84. The channels are open on their inner sides, to the recess 94. An inlet port 100 is provided for admission of material into the channel 96, while an inlet port 102 is provided for admission of material into the channel 98. Pipe, or conduit means (not shown) are arranged to conduct liquid material to the channels 96 and 98, for mixing, or blending in the mixer 80.

A disc-like ring 104 is positioned in the recess 94, which ring has a plurality of feed port grooves 106 and 108 arranged in alternate sequence on each side of the ring. The feed ports are each formed with a radial groove which extends between the sides of the ring 104, as best seen in FIG. 3, and which provide for flow of material from the channels 96 and 98 into the circumferential recess 94. To compensate for pressure drop in the channels 96 and 98, and assure uniform material flow therefrom into the recess 94, flow masks, in the form of disc means 107 and 109, having graduated diameter openings 110 and 112 respectively, are interposed between the channels 96 and 98 and the ring 104.

Positioned within the housing bore 86 is a disc 114 arranged for rotation by a drive shaft 116 driven by a sprocket 118 mounted on the shaft, and a chain 120, which is moved by a power means (not shown). The disc 114 is in snug sliding engagement with the bore 86 as well as a side of projection 90. An axial projection 122 is formed integral, or otherwise secured to the forward face of the disc 114, said projection having a smooth tapered portion 124 the outer extremity of which is in alignment with one edge of the recess 94. Surrounding the projection 122 is a flanged cylindrical member 126 supported for rotation by a roller bearing 128 mounted in the bore 88. A flange 130 of the member 126 is in snug sliding engagement with the bore 88 as well as the projection 92. The rear edge of the flange 130 is in alignment with the other edge of the recess 94. It will be seen that a cylindrical mixing chamber, defined by a uniformly thick passageway 132, the width of which is substantially equivalent to the width of the recess 94, is thus provided between the adjacent surfaces of the projection 122 and the cylindrical member 126.

A nose piece 134, secured to the forward end of the cylindrical member 126, has an axial passageway 136 for receipt of material flowing through the mixing chamber 132. A valve means 138 is arranged to regulate flow of material in passageway 136.

Means for rotation of the cylindrical member 126 are provided, which include a sprocket 140 secured to the member 126, and a chain 142 which is moved by a power means (not shown). Induction heating coils 144 and 146 are provided to maintain desired temperature of the material passing through the mixer 80. Container means 148 and 150, provided for the coils 144 and 146 respectively, are removably secured to the housings 82 and 84 by fastening means, such as sleeved bolts 152.

Operation of the mixer 80 is as follows: assume that it is desired to blend, or mix white and black pigmented polymers, such as polystyrene, which are pumped into the inlet ports 100 and 102 respectively by extruders (not shown). The polymers pass through the feed port grooves 106 and 108 respectively of the ring 104, which arranges the white and black polymers in adjacent repetitive sectors around the periphery of the circumferential recess 94. As the polymers are forced through the recess 94 and into the passageway 132, rotary movement of the disc 114 and the projection 122, as well as the cylindrical element 126, relative to the feed port ring 104, will cause an intimate mixing of the polymers.

Four basic mixing patterns, as with the mixer 6, may be generated by altering the rotational velocity profile relative to the feed port ring 104. It will be found that both mixers 6 and 80, will satisfy all of the objectives set forth hereinbefore.

The foregoing description has been given in detail without though of limitation since the inventive princples involved are capable of assuming other forms without departing from the spirit of the invention or the scope of the following claims.

What is claimed is:

1. A method of mixing diverse viscous liquids comprising the steps of, arranging the liquids in alternate repetitive sequence within a circle to provide a plurality of sectors all of which have a common plane of intersection, causing the sectors to move inwardly toward the axis of the circle, applying frictional force to the outer side boundaries of the sectors to create a shear stress within the liquids, and directing the liquids along an axial path after they reach the central region of the circle.

2. A method of mixing diverse viscous liquids according to claim 1, wherein friction forces applied to a first side of the sectors are moved in an arcuate path relative to the sectors while the friction forces applied to a second side of the sectors are applied without arcuate movement relative to the sectors.

3. A method of mixing diverse viscous liquids according to claim 1, wherein friction forces applied to a first side of the sectors are moved in an arcuate path relative to the sectors and at a given speed in a given direction while the friction forces applied to a second side of the sectors are applied in an arcuate path to the sectors and at said given speed in the same given direction.

4. A method of mixing diverse viscous liquids according to claim 1, wherein friction forces applied to a first side of the sectors are moved in an arcuate path relative to the sectors and at a given speed in a given direction, while the friction forces applied to the second side of the sectors are applied in an arcuate path and at said given speed, but in an opposite direction to movement of said first friction forces.

5. A method of mixing diverse viscous liquids according to claim 1, wherein said axial path is arranged to define a cylindrical chamber.

6. Apparatus for mixing diverse viscous liquids comprising in combination, two mixer elements having adjacent faces spaced apart to provde a disc-like mixing chamber, means for feeding viscous liquids into said space in an alternate sequential pattern forming sectors extending about the entire periphery of the mixing chamber, means to rotate the mixer elements to induce a shear stress in the liquids to cause a mixing thereof, and means to remove said liquids from the axial region of the mixing chamber.

7. Apparatus for mixing diverse viscous liquids comprising in combinaton, two disc-like elements spaced apart a unform distance to provide a mixing chamber, said elements being rotatable about a common axis, means to feed at least two diverse viscous liquids into said mixing chamber in alternate sequential manner about the entire periphery of the chamber, means to rotate said disc-like elements to generate a shear stress in the liquids to cause a mixing thereof, and means providing an axial passageway whereby mixed liquids may be removed from the mixing chamber.

8. Apparatus for mixing diverse viscous liquids comprising in combination, two disc-like elements spaced apart a unform distance to provide a mixing chamber, said elements being rotatable about a common axis, means to feed at least two diverse viscous liquids into said mixing chamber in alternate sequential manner about the entire periphery of the chamber, means to rotate said disc-like elements to generate a shear stress in the liquids to cause a mixing thereof, and means providing an axial passageway whereby mixed liquids may be removed from the mixing chamber.

9. Apparatus according to claim 8 wherein said axial passageway is cylindrical in form.

10. Apparatus for mixing diverse viscous liquids comprising in combination, a housing, two disc-like elements within the housing and spaced apart a uniform distance to provide a mixing chamber, said elements being rotatable about a common axis, a feed port ring within the housing and arranged about the mixing chamber, said feed port ring having a plurality of feed ports whereby diverse liquids can be fed into the mixing chamber in alternate repetitive sequence, and shaft means to rotate said disc-like elements to generate a shear stress in the liquids to cause a mixing thereof, said shaft means being arranged for independent rotation of the disc-like elements, one of said shaft means being formed to define an axial passageway for removal of the mixed liquids from the mixing chamber.

11. Apparatus according to claim 10, wherein said axial passageway is cylindrical in form.

12. Apparatus for mixing diverse viscous liquids comprising in combination, rotatable disc mixer means having adjacent faces spaced apart to provide a disc like mixing chamber, means for feeding viscous liquids into said chamber in an alternate sequential pattern, means to rotate said disc mixer means to induce a shear stress in the viscous liquids to cause a mixing together thereof, and means to remove said liquids from said chamber.

References Cited by the Examiner

UNITED STATES PATENTS

| 1,728,178 | 9/29 | Eppenbach | 259—9 |
| 2,960,318 | 11/60 | Caillaud | 259—9 |
| 2,973,945 | 3/61 | Schneider | 259—9 |
| 3,008,696 | 11/61 | Oldershaw et al. | 259—9 X |
| 3,064,307 | 11/62 | Sanborn | 259—9 X |
| 3,067,987 | 12/62 | Ballou et al. | 259—9 X |
| 3,075,747 | 1/63 | Calvert | 259—6 X |
| 3,127,152 | 3/64 | Schrenk et al. | 259—9 X |

FOREIGN PATENTS 550,742   1/43   Great Britain.

CHARLES A. WILLMUTH, *Primary Examiner.*